United States Patent
Chen et al.

(10) Patent No.: US 9,179,426 B2
(45) Date of Patent: Nov. 3, 2015

(54) MODULATION AND CODING SCHEME ADJUSTMENT FOR UPLINK CHANNEL POWER CONTROL IN ADVANCED TELECOMMUNICATION NETWORKS

(75) Inventors: Wanshi Chen, San Diego, CA (US); Tao Luo, San Diego, CA (US); Juan Montojo, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 289 days.

(21) Appl. No.: 13/101,966

(22) Filed: May 5, 2011

(65) Prior Publication Data

US 2011/0274022 A1     Nov. 10, 2011

Related U.S. Application Data

(60) Provisional application No. 61/332,656, filed on May 7, 2010.

(51) Int. Cl.
| | |
|---|---|
| *H04W 52/00* | (2009.01) |
| *H04W 52/42* | (2009.01) |
| *H04B 7/04* | (2006.01) |
| *H04W 52/14* | (2009.01) |
| *H04W 52/26* | (2009.01) |

(52) U.S. Cl.
CPC ............ *H04W 52/42* (2013.01); *H04B 7/0413* (2013.01); *H04W 52/146* (2013.01); *H04W 52/262* (2013.01); *H04W 52/267* (2013.01)

(58) Field of Classification Search
CPC . H04W 52/02; H04W 52/0203; H04W 84/12; H04W 84/18
USPC .................. 370/310, 311, 318, 324
See application file for complete search history.

(56) References Cited

U.S. PATENT DOCUMENTS

| | | |
|---|---|---|
| 8,655,396 B2 | 2/2014 | Malladi et al. |
| 2008/0080641 A1 | 4/2008 | Kim |
| 2008/0225791 A1 | 9/2008 | Pi et al. |
| 2008/0232449 A1* | 9/2008 | Khan et al. ............. 375/220 |

(Continued)

FOREIGN PATENT DOCUMENTS

| | | |
|---|---|---|
| CN | 101123458 A | 2/2008 |
| KR | 20080084689 A | 9/2008 |

(Continued)

OTHER PUBLICATIONS

Ericsson et al: "Layer Shiftinging the Uplink" 3GPP Draft ; R1-094282, 3rd Generation Pa,rtnership Project. (3GPP), Mobile Competence Centre ; 650, Route Des Lucioles ; F-06921 Sophia-Antipolis Cedex ; France, No. Miyazaki; 20091012, Oct. 12, 2009, XP050388744, [ retrieved on 2009-10-06.1 chapters 1-3 figure 1.

(Continued)

*Primary Examiner* — Andrew Lai
*Assistant Examiner* — Zhiren Qin
(74) *Attorney, Agent, or Firm* — Jimmy Cheng (57) ABSTRACT

A method of adjusting the modulation and coding scheme for uplink channel power control in advanced telecommunication networks includes receiving an indication of a power adjustment mode for an uplink multiple-input multiple-output (MIMO) transmission. The power of the uplink MIMO transmission is adjusted according to the received power adjustment mode.

26 Claims, 6 Drawing Sheets

(56) References Cited

U.S. PATENT DOCUMENTS

| | | | |
|---|---|---|---|
| 2010/0246405 A1 | 9/2010 | Potkonjak | |
| 2010/0246705 A1* | 9/2010 | Shin et al. | 375/267 |

FOREIGN PATENT DOCUMENTS

| | | | |
|---|---|---|---|
| KR | 20090038654 A | 4/2009 | |
| WO | WO-2008030806 | 3/2008 | |
| WO | WO-2008058143 A2 | 5/2008 | |
| WO | WO-2008147297 A2 | 12/2008 | |
| WO | WO2009051412 A2 | 4/2009 | |
| WO | WO-2010032385 A1 | 3/2010 | |

OTHER PUBLICATIONS

International Search Report and Written Opinion—PCT/US2011/035626—ISA/EPO—Jul. 29, 2011.
Motorola: "UL Power Control for Multi-Antenna UE" 3GPP Draft; R1-101115 UL Power Control for Multi-Antenna UE (Final Clean), 3rd Generation Partnership Project (3GPP), Mobile Competence Centre ; 650, Route Des Lucioles ; F-06921 Sophia-Antipolis Cedex ; France, v o l . RAN WG1, No. San Francisco, USA; 20100222, Feb. 16, 2010, XP050418668, [ retrieved on 2010-02-161].
Samsung "UL SU-MIMO power control" 3GPP Draft; R1-102182 UL SU-MIMO Power Control, 3rd Generation Partnership Project (3GPP), Mobile Competence Centre ; 650, Route Des Lucioles ; F-06921 Sophia-Antipolis Cedex ; France, vol. RAN WG1, No. Beijing , china; 20100412, 6 Apr. 1, 2010 (Apr. 6, 2010), XP050419465, [ retrieved on 2010-04-061.
Texas Instruments: Specifying Basic Building Blocks of UL Multi-Antenna Transmission [online], 3GPP TSG-RAN WG1#61 R1-102828,<URL: http://www.3gpp.org/ftp/tsg_ran/WG1_RL1/TSGR1_61/Docs/R1-102828.zip>.
Ericsson, "Layer Shifting in the Link, R1-094208," 3GPP TSG-RAN WG1 #58bis, pp. 1-8.
Nortel: "UL MU-MIMO Performance Improvement for E-UTRA with SIC Receiver [online]", 3GPP TSG-RAN WG1#50, R1-073301, Aug. 20-24, 2007, pp. 1-7.
Huawei: "Uplink Multi-Antenna Power Control", 3GPP TSG-RAN WG1#61, R1-103094, May 4, 2010, 4 Pages, URL: http://www.3gpp.org/ftp/tsg_ran/WG1_RL1/TSGR1_61/Docs/R1-103094.zip.

* cited by examiner

MODULATION AND CODING SCHEME ADJUSTMENT FOR UPLINK CHANNEL POWER CONTROL IN ADVANCED TELECOMMUNICATION NETWORKS

CROSS-REFERENCE TO RELATED APPLICATION

This application claims benefit under 35 U.S.C. §119(e) to U.S. Provisional Patent Application No. 61/332,656, entitled MODULATION AND CODING SCHEME ADJUSTMENT FOR UPLINK CHANNEL POWER CONTROL IN ADVANCED TELECOMMUNICATION NETWORKS, filed on May 7, 2010, the disclosure of which is expressly incorporated by reference herein in its entirety.

BACKGROUND

1. Field

The following description relates generally to wireless communications systems and, more particularly, to modulation and coding scheme (MCS) adjustment for uplink channel power control in an advanced telecommunications network.

2. Background

Wireless communication networks are widely deployed to provide various communication services such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations that can support communication for a number of user equipments (UEs). A UE may communicate with a base station via the downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities.

SUMMARY

In one aspect, a method of wireless communication is disclosed. The method includes receiving an indication of a power adjustment mode for an uplink multiple-input multiple-output (MIMO) transmission. The power of the uplink MIMO transmission is adjusted according to the received power adjustment mode.

Another aspect discloses an apparatus including means for receiving an indication of a power adjustment mode for an uplink multiple-input multiple-output (MIMO) transmission. Also included is means for adjusting the power of the uplink MIMO transmission according to the received power adjustment mode.

In another aspect, a computer program product for wireless communications in a wireless network is disclosed. The computer readable medium has program code recorded thereon which, when executed by one or more processors, causes the processor(s) to receive an indication of a power adjustment mode for an uplink multiple-input multiple-output (MIMO) transmission. The program code also causes the processor(s) to adjust the power of the uplink MIMO transmission according to the received power adjustment mode.

Another aspect discloses a wireless communications apparatus having a memory and at least one processor coupled to the memory. The processor(s) is configured to receive an indication of a power adjustment mode for an uplink multiple-input multiple-output (MIMO) transmission. The processor is also configured to adjust the power of the uplink MIMO transmission according to the received power adjustment mode.

This has outlined, rather broadly, the features and technical advantages of the present disclosure in order that the detailed description that follows may be better understood. Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), CDMA2000, etc. UTRA includes Wideband-CDMA (W-CDMA) and Low Chip Rate (LCR). CDMA2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS and LTE are described in documents from an organization named "3rd Generation Partnership Project" (3GPP). CDMA2000 is described in documents from an organization named "3rd Generation Partnership Project 2" (3GPP2). These various radio technologies and standards are known in the art. For clarity, certain aspects of the techniques are described below for LTE, and LTE terminology is used in much of the description below.

The techniques described herein may be used for various wireless communication networks such as CDMA, TDMA, FDMA, OFDMA, SC-FDMA and other networks. The terms "network" and "system" are often used interchangeably. A CDMA network may implement a radio technology, such as Universal Terrestrial Radio Access (UTRA), Telecommunications Industry Association's (TIA's) CDMA2000®, and the like. The UTRA technology includes Wideband CDMA (WCDMA) and other variants of CDMA. The CDMA2000® technology includes the IS-2000, IS-95 and IS-856 standards from the Electronics Industry Alliance (EIA) and TIA. A TDMA network may implement a radio technology, such as Global System for Mobile Communications (GSM). An OFDMA network may implement a radio technology, such as Evolved UTRA (E-UTRA), Ultra Mobile Broadband (UMB), IEEE 802.11 (Wi-Fi), IEEE 802.16 (WiMAX), IEEE 802.20, Flash-OFDMA, and the like. The UTRA and E-UTRA technologies are part of Universal Mobile Telecommunication System (UMTS). 3GPP Long Term Evolution (LTE) and LTE-Advanced (LTE-A) are newer releases of the UMTS that use E-UTRA. UTRA, E-UTRA, UMTS, LTE, LTE-A and GSM are described in documents from an organization called the "3rd Generation Partnership Project" (3GPP). CDMA2000® and UMB are described in documents from an organization called the "3rd Generation Partnership Project 2" (3GPP2). The techniques described herein may be used for the wireless networks and radio access technologies mentioned above, as well as other wireless networks and radio access technologies. For clarity, certain aspects of the techniques are described below for LTE or LTE-A (together referred to in the alternative as "LTE/-A") and use such LTE/-A terminology in much of the description below.

Figure 1:
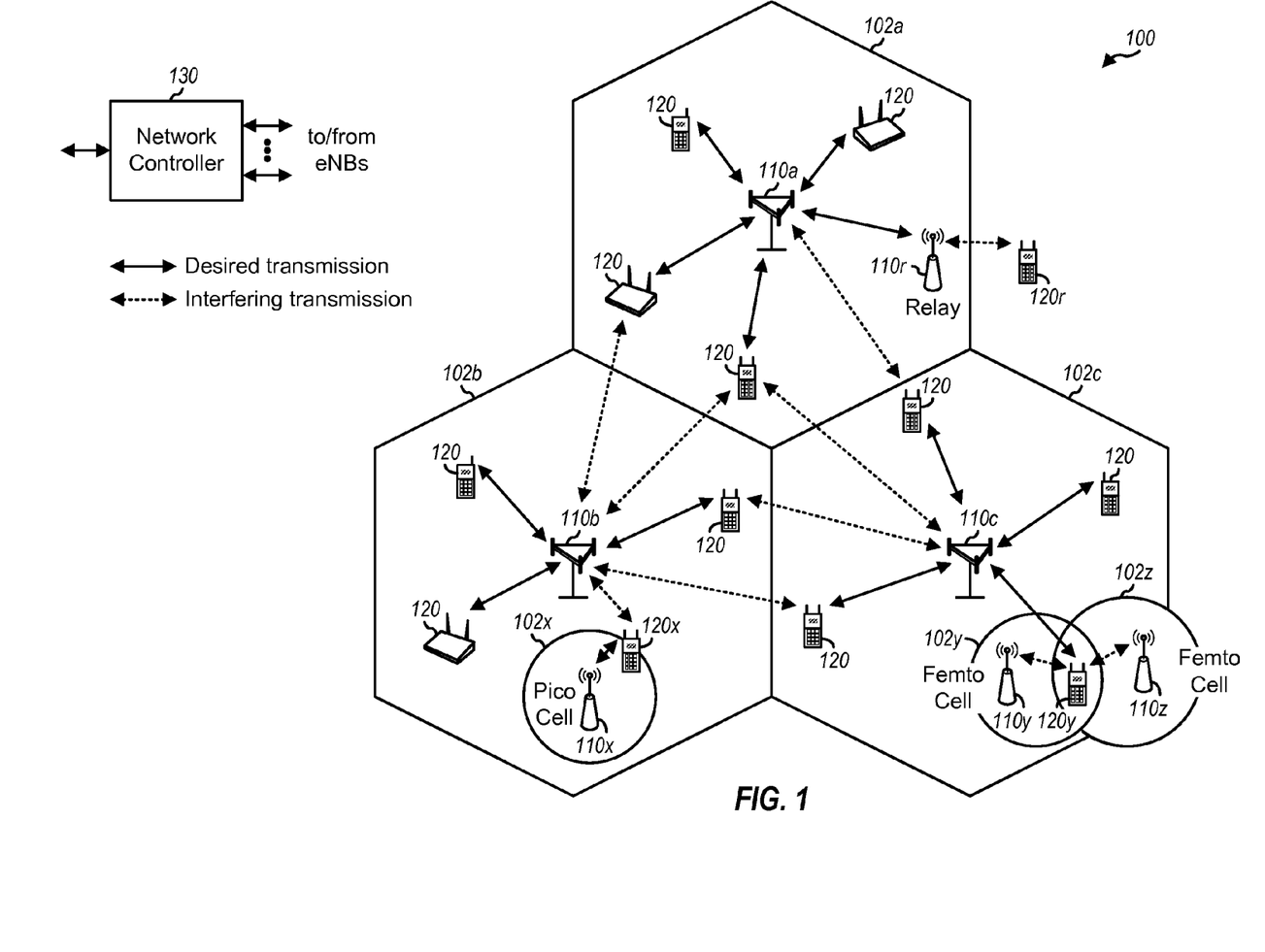
FIG. 1 is a block diagram conceptually illustrating an example of a telecommunications system.

FIG. 1 shows a wireless communication network 100, which may be an LTE-A network, in which a modulation and coding scheme adjustment for uplink channel power control in advanced telecommunication networks may be implemented. The wireless network 100 includes a number of evolved node Bs (eNodeBs) 110 and other network entities. An eNodeB may be a station that communicates with the UEs and may also be referred to as a base station, a node B, an access point, and the like. Each eNodeB 110 may provide communication coverage for a particular geographic area. In 3GPP, the term "cell" can refer to this particular geographic coverage area of an eNodeB and/or an eNodeB subsystem serving the coverage area, depending on the context in which the term is used.

An eNodeB may provide communication coverage for a macro cell, a pico cell, a femto cell, and/or other types of cell. A macro cell generally covers a relatively large geographic area (e.g., several kilometers in radius) and may allow unrestricted access by UEs with service subscriptions with the network provider. A pico cell would generally cover a relatively smaller geographic area and may allow unrestricted access by UEs with service subscriptions with the network provider. A femto cell would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). An eNodeB for a macro cell may be referred to as a macro eNodeB. An eNodeB for a pico cell may be referred to as a pico eNodeB. And, an eNodeB for a femto cell may be referred to as a femto eNodeB or a home eNodeB. In the example shown in FIG. 1, the eNodeBs 110a, 110b and 110c are macro eNodeBs for the macro cells 102a, 102b and 102c, respectively. The eNodeB 110x is a pico eNodeB for a pico cell 102x. And, the eNodeBs 110y and 110z are femto eNodeBs for the femto cells 102y and 102z, respectively. An eNodeB may support one or multiple (e.g., two, three, four, and the like) cells.

The wireless network 100 may also include relay stations. A relay station is a station that receives a transmission of data and/or other information from an upstream station (e.g., an eNodeB, UE, etc.) and sends a transmission of the data and/or other information to a downstream station (e.g., a UE or an eNodeB). A relay station may also be a UE that relays transmissions for other UEs. In the example shown in FIG. 1, a relay station 110r may communicate with the eNodeB 110a and a UE 120r in order to facilitate communication between the eNodeB 110a and the UE 120r. A relay station may also be referred to as a relay eNodeB, a relay, etc.

The wireless network 100 may be a heterogeneous network that includes eNodeBs of different types, e.g., macro eNodeBs, pico eNodeBs, femto eNodeBs, relays, etc. These different types of eNodeBs may have different transmit power levels, different coverage areas, and different impact on interference in the wireless network 100. For example, macro eNodeBs may have a high transmit power level (e.g., 20 Watts) whereas pico eNodeBs, femto eNodeBs and relays may have a lower transmit power level (e.g., 1 Watt).

The wireless network 100 may support synchronous or asynchronous operation. For synchronous operation, the eNodeBs may have similar frame timing, and transmissions from different eNodeBs may be approximately aligned in time. For asynchronous operation, the eNodeBs may have different frame timing, and transmissions from different eNodeBs may not be aligned in time. The techniques described herein may be used for either synchronous or asynchronous operations.

In one aspect, the wireless network 100 may support Frequency Division Duplex (FDD) or Time Division Duplex (TDD) modes of operation. The techniques described herein may be used for either FDD or TDD mode of operation.

A network controller 130 may couple to a set of eNodeBs 110 and provide coordination and control for these eNodeBs 110. The network controller 130 may communicate with the eNodeBs 110 via a backhaul. The eNodeBs 110 may also communicate with one another, e.g., directly or indirectly via a wireless backhaul or a wireline backhaul.

The UEs 120 (e.g., UE 120x, UE 120y, etc.) are dispersed throughout the wireless network 100, and each UE may be stationary or mobile. A UE may also be referred to as a terminal, a mobile station, a subscriber unit, a station, or the like. A UE may be a cellular phone, a personal digital assistant (PDA), a wireless modem, a wireless communication device, a handheld device, a laptop computer, a cordless phone, a wireless local loop (WLL) station, a tablet, or the like. A UE may be able to communicate with macro eNodeBs, pico eNodeBs, femto eNodeBs, relays, and the like. In FIG. 1, a solid line with double arrows indicates desired transmissions between a UE and a serving eNodeB, which is an eNodeB designated to serve the UE on the downlink and/or uplink. A dashed line with double arrows indicates interfering transmissions between a UE and an eNodeB.

LTE utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, or the like. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a 'resource block') may be 12 subcarriers (or 180 kHz). Consequently, the nominal FFT (Fast Fourier Transform) size may be equal to 128, 256, 512, 1024 or 2048 for a corresponding system bandwidth of 1.25, 2.5, 5, 10 or 20 megahertz (MHz), respectively. The system bandwidth may also be partitioned into sub-bands. For example, a sub-band may cover 1.08 MHz (i.e., 6 resource blocks), and there may be 1, 2, 4, 8 or 16 sub-bands for a corresponding system bandwidth of 1.25, 2.5, 5, 10, 15 or 20 MHz, respectively.

Figure 2:
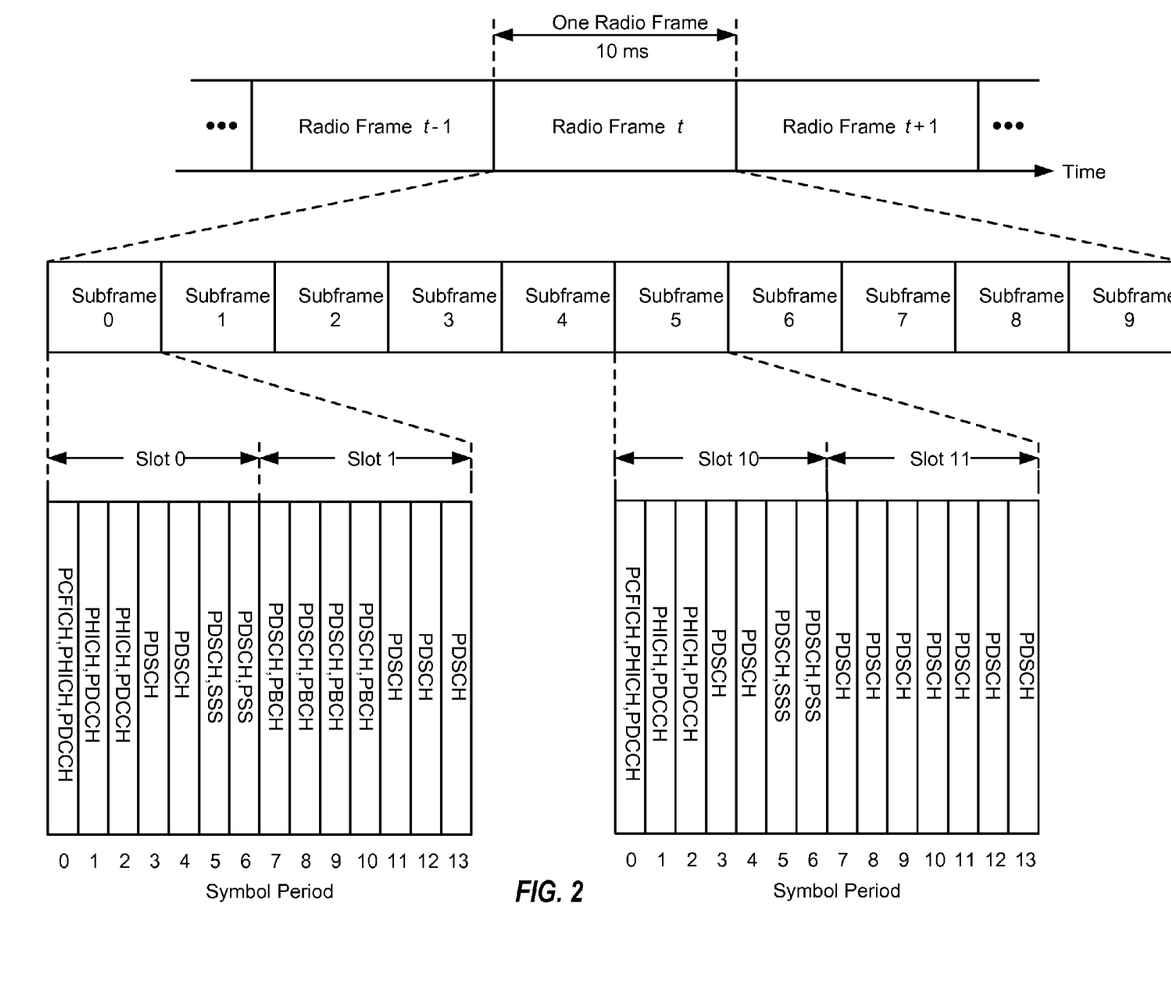
FIG. 2 is a diagram conceptually illustrating an example of a downlink frame structure in a telecommunications system.

FIG. 2 shows a downlink FDD frame structure in which a modulation and coding scheme adjustment for uplink channel power control in advanced telecommunication networks may be transmitted. The transmission timeline for the downlink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., 7 symbol periods for a normal cyclic prefix (as shown in FIG. 2) or 6 symbol periods for an extended cyclic prefix. The 2L symbol periods in each subframe may be assigned indices of 0 through 2L−1. The available time frequency resources may be partitioned into resource blocks. Each resource block may cover N subcarriers (e.g., 12 subcarriers) in one slot.

In LTE, an eNodeB may send a primary synchronization signal (PSS) and a secondary synchronization signal (SSS) for each cell in the eNodeB. For FDD mode of operation, the primary and secondary synchronization signals may be sent in symbol periods 6 and 5, respectively, in each of subframes 0 and 5 of each radio frame with the normal cyclic prefix, as shown in FIG. 2. The synchronization signals may be used by UEs for cell detection and acquisition. For FDD mode of operation, the eNodeB may send a Physical Broadcast Channel (PBCH) in symbol periods 0 to 3 in slot 1 of subframe 0. The PBCH may carry certain system information.

The eNodeB may send a Physical Control Format Indicator Channel (PCFICH) in the first symbol period of each subframe, as seen in FIG. 2. The PCFICH may convey the number of symbol periods (M) used for control channels, where M may be equal to 1, 2 or 3 and may change from subframe to subframe. M may also be equal to 4 for a small system bandwidth, e.g., with less than 10 resource blocks. In the example shown in FIG. 2, M=3. The eNodeB may send a Physical HARQ Indicator Channel (PHICH) and a Physical Downlink Control Channel (PDCCH) in the first M symbol periods of each subframe. The PDCCH and PHICH are also included in the first three symbol periods in the example shown in FIG. 2. The PHICH may carry information to support hybrid automatic retransmission (HARQ). The PDCCH may carry information on uplink and downlink resource allocation for UEs and power control information for uplink channels. The eNodeB may send a Physical Downlink Shared Channel (PDSCH) in the remaining symbol periods of each subframe. The PDSCH may carry data for UEs scheduled for data transmission on the downlink.

The eNodeB may send the PSC, SSC and PBCH in the center 1.08 MHz of the system bandwidth used by the eNodeB. The eNodeB may send the PCFICH and PHICH across the entire system bandwidth in each symbol period in which these channels are sent. The eNodeB may send the PDCCH to groups of UEs in certain portions of the system bandwidth. The eNodeB may send the PDSCH to groups of UEs in specific portions of the system bandwidth. The eNodeB may send the PSC, SSC, PBCH, PCFICH and PHICH in a broadcast manner to all UEs, may send the PDCCH in a unicast manner to specific UEs, and may also send the PDSCH in a unicast manner to specific UEs.

A number of resource elements may be available in each symbol period. Each resource element may cover one subcarrier in one symbol period and may be used to send one modulation symbol, which may be a real or complex value. For symbols that are used for control channels, the resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1 and 2. The PDCCH may occupy 9, 18, 36 or 72 REGs, which may be selected from the available REGs, in the first M symbol periods. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for all UEs in the PDCCH. An eNodeB may send the PDCCH to the UE in any of the combinations that the UE will search.

A UE may be within the coverage of multiple eNodeBs. One of these eNodeBs may be selected to serve the UE. The serving eNodeB may be selected based on various criteria such as received power, path loss, signal-to-noise ratio (SNR), etc.

Figure 3:
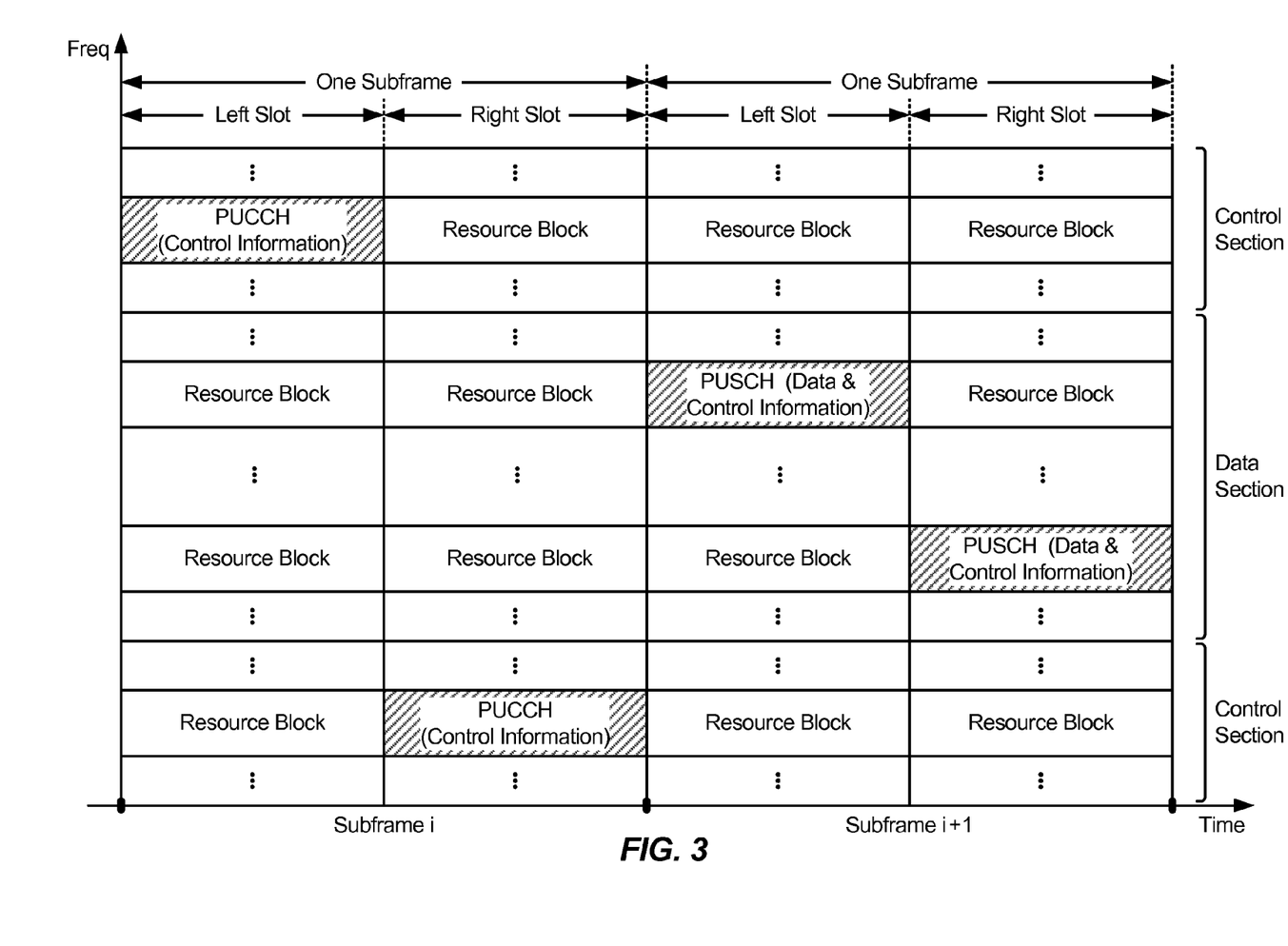
FIG. 3 is a block diagram conceptually illustrating an example frame structure in uplink communications.

FIG. 3 is a block diagram conceptually illustrating an exemplary FDD and TDD (non-special subframe only) subframe structure that may be used in uplink long term evolution (LTE) communications where a modulation and coding scheme adjustment for uplink channel power control is applied.

The available resource blocks (RBs) for the uplink may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The design in FIG. 3 results in the data section including contiguous subcarriers, which may allow a single UE to be assigned all of the contiguous subcarriers in the data section.

A UE may be assigned resource blocks in the control section to transmit control information to an eNodeB. The UE may also be assigned resource blocks in the data section to transmit data to the eNode B. The UE may transmit control information in a Physical Uplink Control Channel (PUCCH) on the assigned resource blocks in the control section. The UE may transmit only data or both data and control information in a Physical Uplink Shared Channel (PUSCH) on the assigned resource blocks in the data section. An uplink transmission may span both slots of a subframe and may hop across frequency as shown in FIG. 3. According to one aspect, in relaxed single carrier operation, parallel channels may be transmitted on the UL resources. For example, a control and a data channel, parallel control channels, and parallel data channels may be transmitted by a UE.

The PSC, SSC, CRS, PBCH, PUCCH, PUSCH, and other such signals and channels used in LTE/-A are described in 3GPP TS 36.211, entitled "Evolved Universal Terrestrial Radio Access (E-UTRA); Physical Channels and Modulation," which is publicly available.

Figure 4:
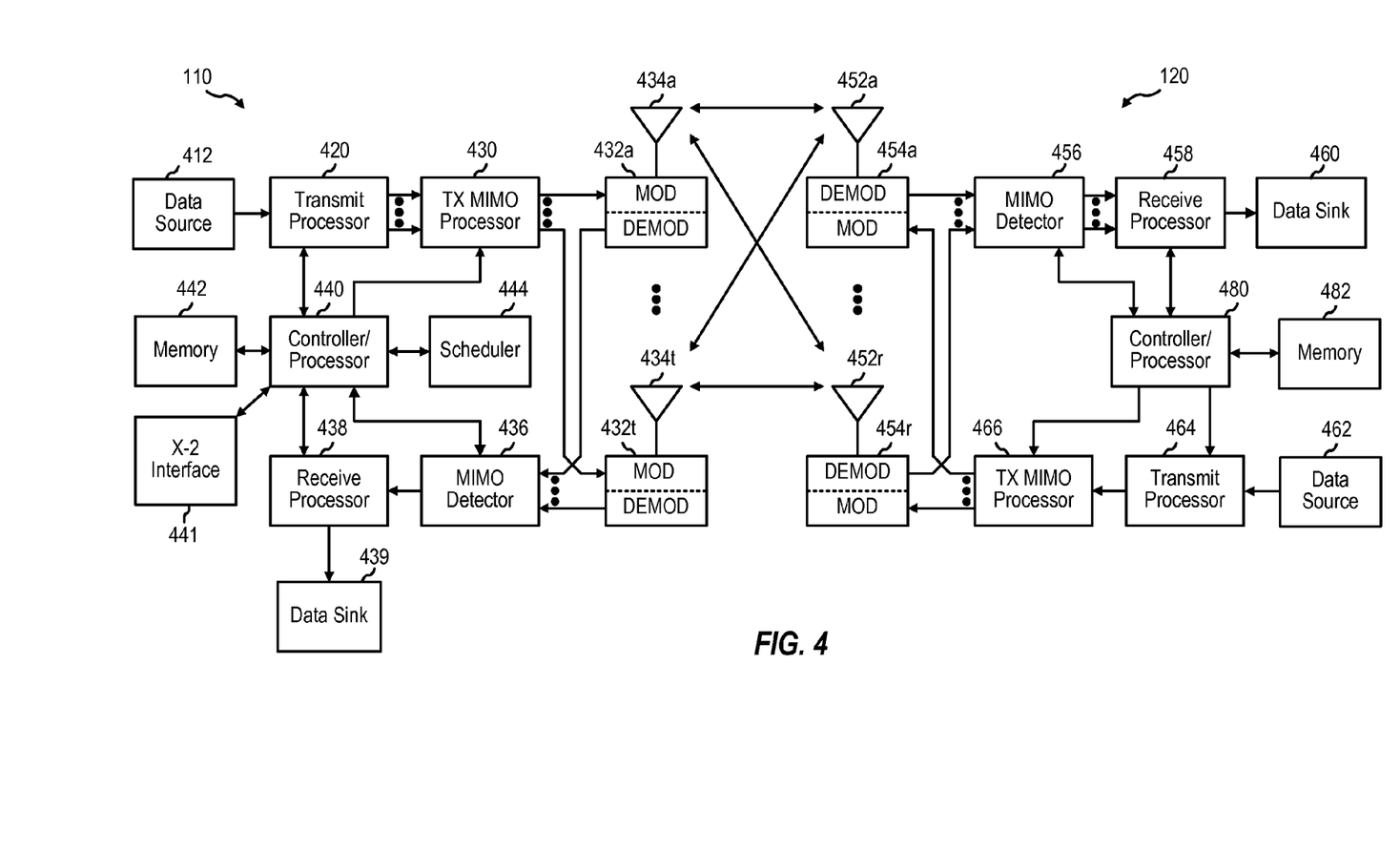
FIG. 4 is a block diagram conceptually illustrating a design of a base station/eNodeB and a UE configured according to one aspect of the present disclosure.

FIG. 4 shows a block diagram of a design of a base station/eNodeB 110 and a UE 120, which may be used in advanced telecommunication networks where a modulation and coding scheme adjustment for uplink channel power control is implemented. The base station/eNodeB 110 and UE 120 may be one of the base stations/eNodeBs and one of the UEs in FIG. 1. The base station 110 may be the macro eNodeB 110c in FIG. 1, and the UE 120 may be the UE 120y. The base station 110 may also be a base station of some other type. The base station 110 may be equipped with antennas 434a through 434t, and the UE 120 may be equipped with antennas 452a through 452r.

At the base station 110, a transmit processor 420 may receive data from a data source 412 and control information from a controller/processor 440. The control information may be for the PBCH, PCFICH, PHICH, PDCCH, etc. The data may be for the PDSCH, etc. The processor 420 may process (e.g., encode and symbol map) the data and control information to obtain data symbols and control symbols, respectively. The processor 420 may also generate reference symbols, e.g., for the PSS, SSS, and cell-specific reference signal. A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DEMODs) 454a through 454r, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at the UE 120, a transmit processor 464 may receive and process data (e.g., for the PUSCH) from a data source 462 and control information (e.g., for the PUCCH) from the controller/processor 480. The processor 464 may also generate reference symbols for a reference signal. The symbols from the transmit processor 464 may be precoded by a TX MIMO processor 466 if applicable, further processed by the modulators 454a through 454r (e.g., for SC-FDM, etc.), and transmitted to the base station 110. At the base station 110, the uplink signals from the UE 120 may be received by the antennas 434, processed by the demodulators 432, detected by a MIMO detector 436 if applicable, and further processed by a receive processor 438 to obtain decoded data and control information sent by the UE 120. The processor 438 may provide the decoded data to a data sink 439 and the decoded control information to the controller/processor 440. The base station 110 can send messages to other base stations, for example, over an X2 interface 441.

The controllers/processors 440 and 480 may direct the operation at the base station 110 and the UE 120, respectively. The processor 440 and/or other processors and modules at the base station 110 may perform or direct the execution of various processes for the techniques described herein. The processor 480 and/or other processors and modules at the UE 120 may also perform or direct the execution of the functional blocks illustrated in FIG. 6, and/or other processes for the techniques described herein. The memories 442 and 482 may store data and program codes for the base station 110 and the UE 120, respectively. A scheduler 444 may schedule UEs for data transmission on the downlink and/or uplink.

Currently, single input multiple output transmission is supported in the uplink transmissions. The setting of the UE transmit power for PUSCH in a subframe i may be as follows:

$$P_{PUSCH}(i) = \min\{P_{CMAX}, 10\log_{10}(M_{PUSCH}(i)) + P_{O\_PUSCH}(j) + \alpha(j) \cdot PL + \Delta_{TF}(i) + f(i)\}$$

$P_{CMAX}$ is the configured UE maximum transmit power. $M_{PUSCH}(i)$ is the bandwidth, in the number of resource blocks, of the PUSCH assignments. $P_{O\_PUSCH}(j)$ is the layer 3 configured offset for different types of PUSCH transmissions. Additionally, $\alpha(j)*PL$ is the fractional path loss compensation. $\Delta_{TF}(i)$ represents the delta MCS (modulation and coding scheme) adjustment. And, $f(i)$ represents the power adjustments driven by power control commands.

The delta MCS adjustment, $\Delta_{TF}(i)$, is a function of transmit MCS and may be represented as: $\Delta_{TF}(i)=10 \log_{10}((2^{MPR*Ks}-1) \beta_{offset}^{PUSCH})$.

In one aspect, Ks=0 is the default value. Or, Ks may equal 1.25, for a layer 3 and UE-specific configuration.

For regular PUSCH transmission, the modulation per resource (MPR) may be represented as $MPR = \Sigma_{r=0}^{C-1} K_r/N_{RE}$. Where C represents the number of code blocks of the initial PUSCH assignments of the same transport block. $K_r$ is the size of code block r of the initial PUSCH assignments of the same transport block. $N_{RE}$ is the number of resource elements, and may be represented as: $N_{RE} = M_{sc}^{PUSCH-initial} N_{symb}^{PUSCH-initial}$. $M_{sc}^{PUSCH-initial}$ is the number of subcarriers in the initial PUSCH assignments and $N_{symb}^{PUSCH-initial}$ is the number of symbols in the initial PUSCH assignments of the same transport block. Additionally, $\beta_{offset}^{PUSCH}$ is equal to 1.

For CSI (channel state information) feedback only transmissions, the MPR may be represented as: $MPR = O_{CQI}/N_{RE}$. $O_{CQI}$ is the number of CSI bits (including CRC (cyclic redundancy check)) and $\beta_{offset}^{PUSCH} = \beta_{offset}^{CQI}$, where $\beta_{offset}^{CQI}$ is a layer 3 configured offset for CQI.

In one aspect, the eNodeB 110 and UE 120 implement and utilize modulation and coding scheme (MCS) adjustment for power control of the uplink channel in an advanced telecommunications network. In particular, the UE 120 can control the uplink channel in MIMO (multiple input multiple output) communication based on modulation and coding scheme (MCS) adjustment as described herein. The UE 120 may include a power control component (not shown) and a radio component (not shown). In one aspect, the radio component may include a transmission component with α=T (e.g., UE), that can deliver data and signaling to the eNodeB 110. The radio component may also include a reception component that can receive data and signaling from the eNodeB 110. In one example, the radio component receives a power adjustment configuration, such as an indication of a power adjustment mode that is based on adjustment of a transport format (TF) (e.g., adjustment of MCS $\Delta_{TF}$). In an aspect, the power adjustment configuration may be stored in memory such as in a register that can contain an MCS configuration or indicator of a particular implementation of MCS adjustment. The MCS configuration can indicate a stage in the uplink physical channel processing at which power adjustment is implemented.

Figure 5:
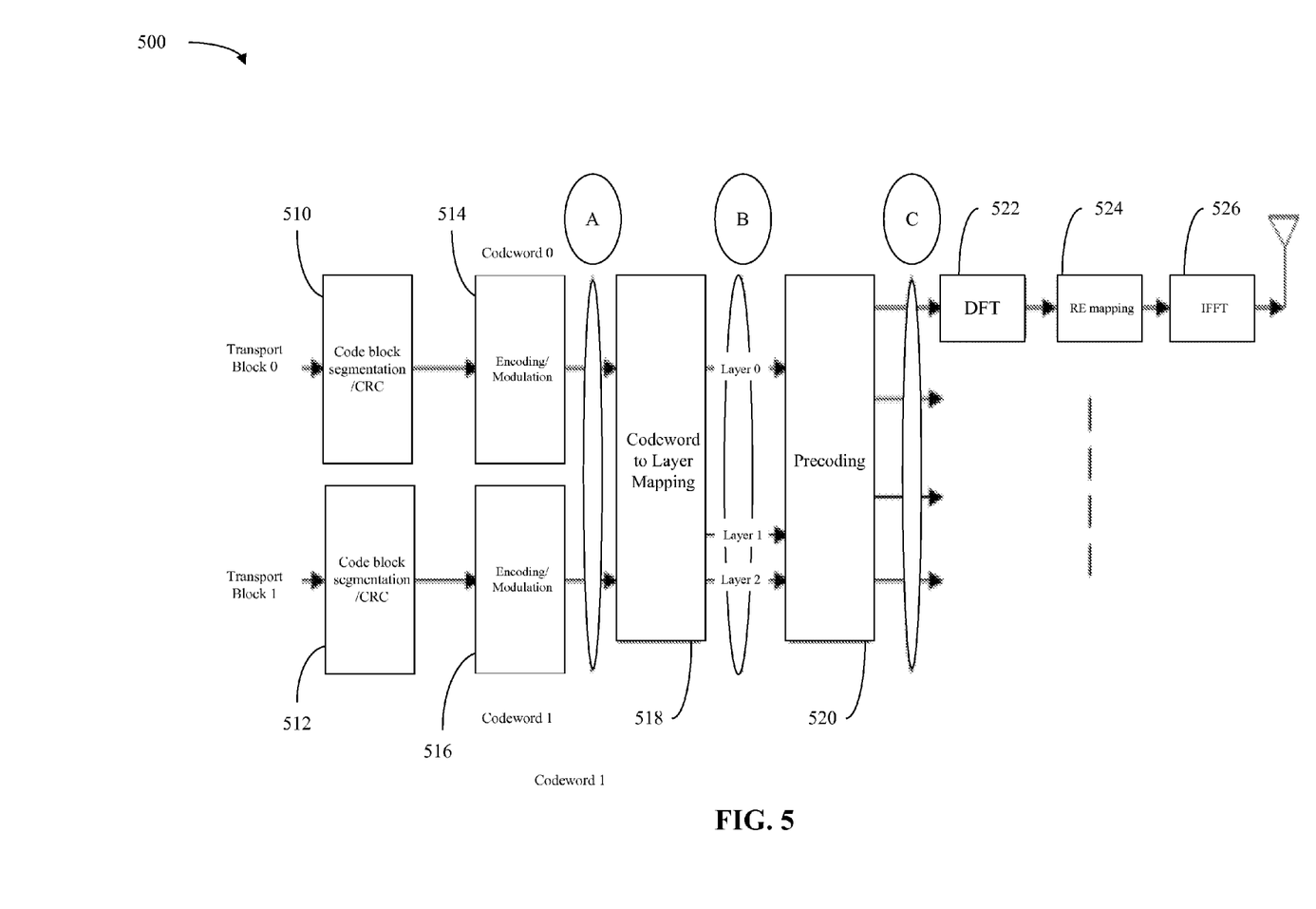
FIG. 5 is a diagram illustrating uplink physical channel processing according to one aspect of the present disclosure.

FIG. 5 illustrates a diagram 500 demonstrating how uplink transmission may be performed for a MIMO system. There are two transport blocks, 0 and 1. For transport block 0, code block segmentation and CRC (cyclic redundancy check) are performed at block 510. Similarly, for transport block 1, code block segmentation and CRC are applied at block 512. Encoding and modulation are performed at blocks 514 and 516, where the codeword is 0 for block 514 and the codeword is 1 for block 516. At block 518 codeword to layer mapping is performed. In one aspect, the two codewords may be mapped to three layers (e.g., Layer 0, Layer 1 and Layer 2), although other mappings are possible. Precoding is then applied at block 520. Next, discrete Fourier transform processing is applied at block 522, followed by resource mapping at block 524 and then inverse fast Fourier transform processing at block 526. It should be appreciated that in FIG. 5, three layers (e.g., rank 3 transmission) and two codewords (CW) are illustrated, where codeword 0 has one layer and the other codeword has two layers. However, the various embodiments and features of the subject disclosure are not so limited. In particular, one codeword may be mapped to one or two layers. The same transport block may be mapped to one or two layers over different HARQ transmissions.

In one aspect, as illustrated in FIG. 5, the power adjustment may be implemented at various stages of the uplink physical channel process. In one aspect, the power adjustment is applied at reference point A, which occurs prior to layer mapping. In another aspect, the power adjustment is implemented at reference point B, which occurs after layer mapping but before precoding. In yet another aspect, the power adjustment is performed at reference point C, which occurs after precoding.

In one aspect, the delta MCS adjustment is performed on a codeword basis because different codewords may have different modulation and coding schemes. Additionally, different layers within one codeword have the same modulation and coding scheme.

Optionally, the delta MCS adjustment may be performed on a transport block basis. The delta MCS adjustment is based on the initial PUSCH assignment for a given transport block. In another aspect, the delta MCS adjustment may be based on the latest PUSCH assignment.

When the resource elements are computed for PUSCH transmission, the resource elements for uplink control information (UCI) are also counted. Alternately, in another aspect, resource elements for uplink control information may be discounted if piggybacking on PUSCH.

In one aspect, the power adjustment is performed at reference point C and provides single power scaling for composite MIMO transmissions. The modulation per resource (MPR) for each antenna port may be computed by $MPR_{MIMO} = \Sigma_{CW} \Sigma_{rCW} K_{CW,rCW}/\Sigma_{CW} N_{RE,CW}$, where the summation is done for each codeword, and within each codeword for each code block "r." $K_{CW,rCW}$ represents the size of the code block, $r_{CW}$, of the codeword, CW, in the initial PUSCH assignments of the same transport block. Additionally, $N_{RE,CW}$ represents the number of resource elements of the codeword, CW, in the initial PUSCH assignments of the same transport block. $N_{RE,CW} = M_{sc,CW}^{PUSCH-initial} N_{symb,CW}^{PUSCH-initial}$. The delta MCS adjustment may then be computed as $\Delta_{TF}(i)=10 \log_{10}((2^{MPRMIMO*Ks}-1) \beta_{offset}^{PUSCH})$. Performing the power adjustment at reference point C allows for single power scaling and does not differentiate between codewords.

In another aspect, the power adjustment is performed at reference point B and allows for power scaling on a layer basis, where each layer is treated the same. In particular, the maximum power reduction for each layer m of a codeword CW may be computed by $MPR_{CW,m} = \Sigma_{rCW,m} K_{rCW,m}/N_{RE,CW,m} O$. The summation is done within each codeword (CW) and each layer (m), for all code blocks (r). $K_{rCW,m}$ represents the size of the code block ($r_{CW}$) of the codeword (CW) of the layer (m) in the initial PUSCH assignments of the same transport block. Due to layer mapping, the code block for the layer m for a given codeword represents only a fraction of the original code block, before layer mapping. $N_{RE,CW,m}$ represents the number of resource elements of the codeword (CW) and the layer (m) in the initial PUSCH assignments of the same transport block. In one aspect, the computed $MPR_{CW,m}$ for the layers of the same codeword are the same. An adjustment may occur for each layer, where the delta MCS adjustment (for each layer) may be computed as $\Delta_{TF}(i)=10 \log_{10}((2^{MPRCW,m*Ks}-1) \beta_{offset}^{PUSCH})$.

In another aspect, the power adjustment considers power scaling on a codeword basis. In particular, the power adjustment may be performed at reference point A, before layer mapping, where the MPR for each codeword may be computed by $MPR_{CW} = \Sigma_m \Sigma_{rCW,m} K_{rCW,m}/N_{RE,CW}/M_{CW}$. The summation is performed, within each codeword CW, for each layer m, and for all code blocks r. $K_{rCW,m}$ is the size of the code block $r_{CW}$ of codeword CW of the layer m in the initial PUSCH assignments of the same transport block. Due to the layer mapping, the code block for layer m for a given codeword represents only a fraction of the original code block, before layer mapping. $N_{RE,CW}$ is the number of resource elements of the codeword CW in the initial PUSCH assignments of the same transport block. $M_{CW}$ is the number of layers of the codeword CW. An adjustment occurs for each codeword, where the delta MCS adjustment may be computed as $\Delta_{TF}(i)= 10 \log_{10}((2^{MPRCW*Ks}-1)\beta_{offset}^{PUSCH})$.

In another aspect, the power adjustment considers power scaling on a codeword basis and the power adjustment may be performed at reference point A or reference point B. The maximum power reduction may be computed by $MPR_{CW}=\Sigma_{rCW} K_{rCW}/N_{RE,CW}/M_{CW}$, where the summation is done, within each codeword CW, and for all code blocks r, over all layers. $K_{rCW}$ is the size of code block $r_{CW}$ of the codeword CW in the initial PUSCH assignments of the same transport block. $N_{RE,CW}$ is the number of resource elements of the codeword CW in the initial PUSCH assignments of the same transport block. $M_{CW}$ is the number of layers of the codeword CW. The delta MCS adjustment for each codeword may be computed as $\Delta_{TF}(i)=10 \log_{10}((2^{MPRCW*Ks}-1)\beta_{offset}^{PUSCH})$.

In another aspect, an additional adjustment may be applied to inter-layer and/or inter-codeword interference. There are numerous ways in which the UE may be configured with such adjustment. In one example, as a default, the UE is not configured to have such an adjustment. If the UE is configured to have the adjustment, the offset can be set similarly to parameter Ks. This may be applicable when there are two layers for each codeword and/or there are two codewords. Additionally, the offset can also be set to address only inter-layer interference, or only inter-codeword interference, or a combination thereof.

In one aspect, adjusting the power is dependent on at least one of a number of information bits of the uplink MIMO transmission, a coding rate of the uplink MIMO transmission, and a number of resources utilized by the uplink MIMO transmission. The number of resources may comprise units of resource elements and is determined on an initial assignment of a codeword of the uplink MIMO transmission. The number of resources may include resources utilized by uplink control information and multiplexed with uplink data on a same uplink MIMO transmission.

In each of these embodiments, $\Delta_{TF}$, or delta MCS adjustment, also referred in the subject disclosure as MCS adjustment, may be computed according to specific definitions. In UE 120, a power control component can compute the delta MCS adjustment ($\Delta_{TF}$) according to a received MCS configuration or power adjustment mode.

The user equipment 120 may be an access terminal (also referred to as terminal, access terminal, mobile station, or mobile device). In one aspect, the radio component may include multiple antennas, (e.g., antenna 1, antenna 2 ..., antenna Q (with Q a natural number greater than or equal to unity)) that enable, at least in part, MIMO communication in the uplink.

The base station 110 (also referred to as a node, evolved node B (eNB), serving eNB, target eNB, remote radio head (RRH), femtocell base station, pico cell base station) can configure a power adjustment mode as described herein. In an aspect, a configuration component can deliver an indication of a power adjustment mode to a UE 120 that establishes the MCS configuration, which then establishes the various manners to compute $\Delta_{TF}$ as described in the subject disclosure.

Figure 6:
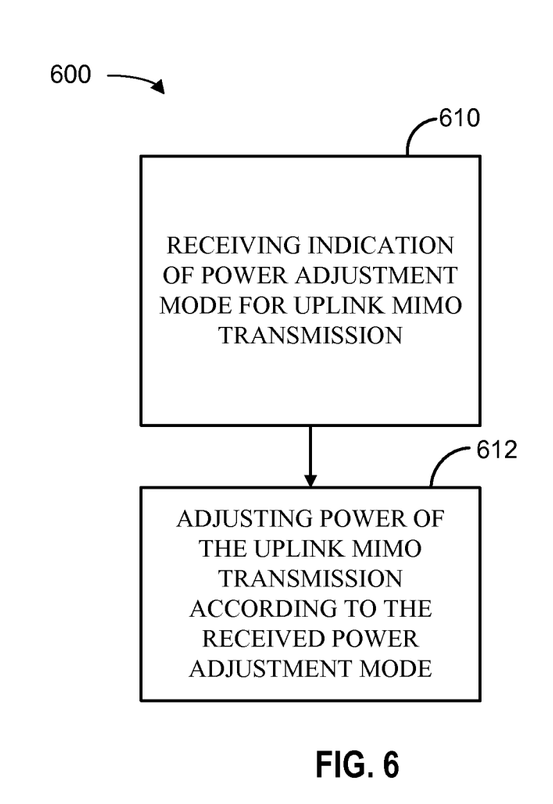
FIG. 6 is a block diagram illustrating a method for modulation and coding scheme (MCS) adjustment for uplink channel power control in an advanced telecommunications network.

FIG. 6 illustrates a method 600 for adjusting modulation and coding schemes for uplink channel power control in a 3GPP LTE Advanced (LTE-A). In block 610, a UE receives an indication of a power adjustment mode for an uplink MIMO transmission. In block 612, the UE adjusts the power of the uplink MIMO transmission according to the received power adjustment mode.

In one configuration, the UE 120 is configured for wireless communication including means for receiving an indication of a power adjustment mode. In one aspect, the receiving means may be, e.g., the antenna 452*a-r*, demodulators 454*a-r*, MIMO detector 456, receive processor 458, controller/processor 480 and memory 482 configured to perform the functions of the receiving means. The UE 120 is also configured to include a means for adjusting power. In one aspect, the adjusting means may be the controller/processor 480 and memory 482 configured to perform the functions of the adjusting means. In another aspect, the aforementioned means may be a module or any apparatus configured to perform the functions of the aforementioned means.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication, comprising:
   receiving an indication of a power adjustment mode for an uplink multiple-input multiple-output (MIMO) transmission, the indication further indicating at least one uplink channel processing stage for implementing the power adjustment, the at least one uplink channel processing stage comprising one or more of a first stage after precoding, a second stage after layer mapping and prior to the precoding, a third stage before the layer mapping, or a combination thereof; and
   adjusting power of the uplink MIMO transmission at the at least one indicated uplink channel processing stage and according to the power adjustment mode.

2. The method of claim 1, in which adjusting the power is based at least in part on one or more of a number of information bits of the uplink MIMO transmission, a coding rate of the uplink MIMO transmission, a number of resources utilized by the uplink MIMO transmission, or a combination thereof.

3. The method of claim 2, in which the number of resources comprises units of resource elements and is determined on an initial assignment of a codeword of the uplink MIMO transmission.

4. The method of claim 3, in which the number of resources includes resources utilized by uplink control information and multiplexed with uplink data on a same uplink MIMO transmission.

5. The method of claim 1, in which the uplink MIMO transmission comprises two codewords.

6. The method of claim 5, in which at least one codeword of the two codewords is mapped to at least two layers.

7. The method of claim 1, in which the power adjustment mode comprises power scaling for a composite MIMO transmission.

8. The method of claim 1, in which the power adjustment mode comprises power scaling for each layer of a codeword of the uplink MIMO transmission.

9. The method of claim 1, in which the power adjustment mode comprises power scaling for each codeword.

10. The method of claim 9, in which the power adjustment mode further comprises power scaling within each codeword for each layer.

11. The method of claim 1, in which the power adjustment mode comprises adjusting the power by an offset parameter to account for at least one of interlayer interference, codeword interference, or a combination thereof.

12. The method of claim 1, in which the power adjustment mode is further based in part on a configured offset parameter when the uplink MIMO transmission contains only channel state information feedback without any uplink data.

13. An apparatus for wireless communication, comprising:
    means for receiving an indication of a power adjustment mode for an uplink multiple-input multiple-output (MIMO) transmission, the indication further indicating at least one uplink channel processing stage for implementing the power adjustment, the at least one uplink channel processing stage comprising one or more of a first stage after precoding, a second stage after layer mapping and prior to the precoding, a third stage before the layer mapping, or a combination thereof; and
    means for adjusting power of the uplink MIMO transmission at the at least one indicated uplink channel processing stage and according to the power adjustment mode.

14. A computer program product for wireless communication in a wireless network, comprising:
    a non-transitory computer-readable medium having program code recorded thereon, the program code being executed by a processor, and the program code comprising:
    program code to receive an indication of a power adjustment mode for an uplink multiple-input multiple-output (MIMO) transmission, the indication further indicating at least one uplink channel processing stage for implementing the power adjustment, the at least one uplink channel processing stage comprising one or more of a first stage after precoding, a second stage after layer mapping and prior to the precoding, a third stage before the layer mapping, or a combination thereof; and
    program code to adjust power of the uplink MIMO transmission at the at least one indicated uplink channel processing stage and according to the power adjustment mode.

15. An apparatus for wireless communication, comprising:
    a memory; and
    at least one processor coupled to the memory, the at least one processor configured to:
    receive an indication of a power adjustment mode for an uplink multiple-input multiple-output (MIMO) transmission, the indication further indicating at least one uplink channel processing stage for implementing the power adjustment, the at least one uplink channel processing stage comprising one or more of a first stage after precoding, a second stage after layer mapping and prior to the precoding, a third stage before the layer mapping, or a combination thereof; and adjust power of the uplink MIMO transmission at the at least one indicated uplink channel processing stage and according to the power adjustment mode.

16. The apparatus of claim 15, in which the processor is further configured to adjust the power based at least in part on one or more of a number of information bits of the uplink MIMO transmission, a coding rate of the uplink MIMO transmission, a number of resources utilized by the uplink MIMO transmission, or a combination thereof.

17. The apparatus of claim 16, in which the number of resources comprises units of resource elements and is determined on an initial assignment of a codeword of the uplink MIMO transmission.

18. The apparatus of claim 17, in which the number of resources includes resources utilized by uplink control information and multiplexed with uplink data on a same uplink MIMO transmission.

19. The apparatus of claim 15, in which the uplink MIMO transmission comprises two codewords.

20. The apparatus of claim 19, in which at least one codeword of the two codewords is mapped to at least two layers.

21. The apparatus of claim 15, in which the power adjustment mode comprises power scaling for a composite MIMO transmission.

22. The apparatus of claim 15, in which the power adjustment mode comprises power scaling for each layer of a codeword of the uplink MIMO transmission.

23. The apparatus of claim 15, in which the power adjustment mode comprises power scaling for each codeword.

24. The apparatus of claim 23, in which the power adjustment mode further comprises power scaling within each codeword for each layer.

25. The apparatus of claim 15, in which the power adjustment mode comprises adjusting the power by an offset parameter to account for at least one of interlayer interference, codeword interference, or a combination thereof.

26. The apparatus of claim 25, in which the power adjustment mode is further based in part on a configured offset parameter when the uplink MIMO transmission contains only channel state information feedback without any uplink data.

* * * * *